United States Patent [19]

Blackston

[11] Patent Number: 5,210,671
[45] Date of Patent: May 11, 1993

[54] WRITE PROTECTION FOR MEMORY DISKETTES

[75] Inventor: Mark D. Blackston, Charlotte, N.C.

[73] Assignee: Verbatim Corporation, Charlotte, N.C.

[21] Appl. No.: 752,091

[22] Filed: Aug. 29, 1991

[51] Int. Cl.⁵ .............................................. G11B 7/26
[52] U.S. Cl. ..................................... 360/133; 360/60; 369/291; 369/292
[58] Field of Search .................. 360/133, 60; 369/291, 369/292

[56] References Cited

U.S. PATENT DOCUMENTS

| | | | |
|---|---|---|---|
| 5,040,167 | 8/1991 | Tanaka et al. | 369/292 |
| 5,091,815 | 2/1992 | Suzuki | 360/133 |
| 5,091,901 | 2/1992 | Yamamoto et al. | 360/133 |

Primary Examiner—David P. Porta
Assistant Examiner—Don Wong
Attorney, Agent, or Firm—A. C. Smith

[57] ABSTRACT

A slide component is configured to be inserted into a recess in an assembled magnetic diskette cartridge and rotated into operable orientation to be slideably positioned between locations in the recess that designate whether or not the magnetic disk in the cartridge is write-protected.

5 Claims, 3 Drawing Sheets

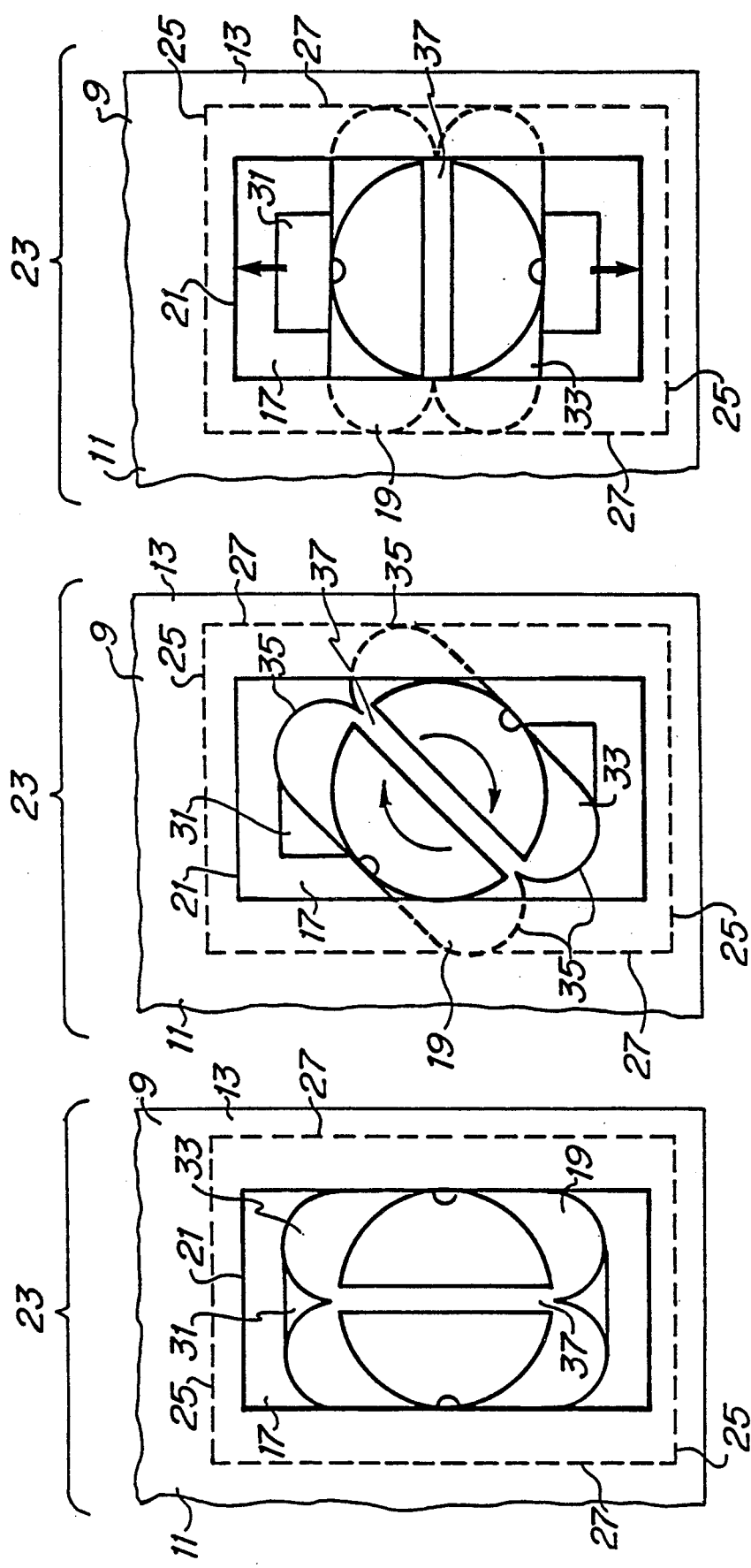

WRITE PROTECTION FOR MEMORY DISKETTES

FIELD OF THE INVENTION

This invention relates to 3.5" magnetic diskettes and more particularly to a snap-in module for selectively providing write protection following manual insertion and manipulation into position on the diskette.

BACKGROUND OF THE INVENTION

Many designs of 3.5" diskette packages contain a magnetic disk which is disposed to rotate while portions of the disk surfaces are in contact with magnetic transducers. Such magnetic diskette may be used once for recording information permanently and thereafter may be altered slightly via a write-protect tab to inhibit recording on the diskette thereafter. Such write-protect tab (or similar device) is usually located near a peripheral edge of the diskette package to be sensed by a transducer which determines whether a tab (or similar device) is in a particular location or not on the diskette package as the indication of whether the magnetic diskette is to be protected against further recording thereon, or not. In some diskette designs, a tab may be omitted from a peripheral recess to indicate the write-protect condition in normal use, and in other diskette designs a slide device is included within a peripheral recess to indicate the write-protect condition in one slide position and an unprotected condition in another slide position. This latter diskette design greatly facilitates the alterable protection condition and the reusability of diskettes previously write-protected. However, assembly of the components that form a complete diskette package is commonly made more complex by the introduction of a slide component into a peripheral recess where such slide components must be retained captive within slide tracks, or the like. Where plastic housing components of the diskette package must be welded or glued or otherwise sealed together, it is frequently difficult to obtain proper slideable operation of the slide component in slide tracks within the housing components by insertion of the tab after such sealing procedure, and this contributes to reject rate in automatic assembly procedures.

SUMMARY OF THE INVENTION

Accordingly, the preferred embodiment of the present invention includes a slideable component that is operable to indicate the write-protection condition of the diskette and that is insertable into a peripheral recess in the diskette package after the housing components which form the diskette package are firmly sealed together. In one embodiment, the slide component has elongated and lateral dimensions which are selected to facilitate positioning in one orientation within the peripheral recess of the assembled diskette package, and to facilitate rotation into an orthogonal orientation within the peripheral recess to remain captivated therein but slideable between two locations in the recess.

DESCRIPTION OF THE DRAWINGS

FIG. 3 is a bottom plan view of the slide component of FIG. 1 positioned for rotation within the peripheral recess;

FIG. 4 is a bottom plan view of the slide component of FIG. 3 being rotated within the peripheral recess;

FIG. 5 is a bottom plan view of the slide component of FIG. 3 rotated into orthogonal orientation relative to the initial orientation for slideable movement within the peripheral recess;

DESCRIPTION OF THE PREFERRED EMBODIMENT

Figure 1:
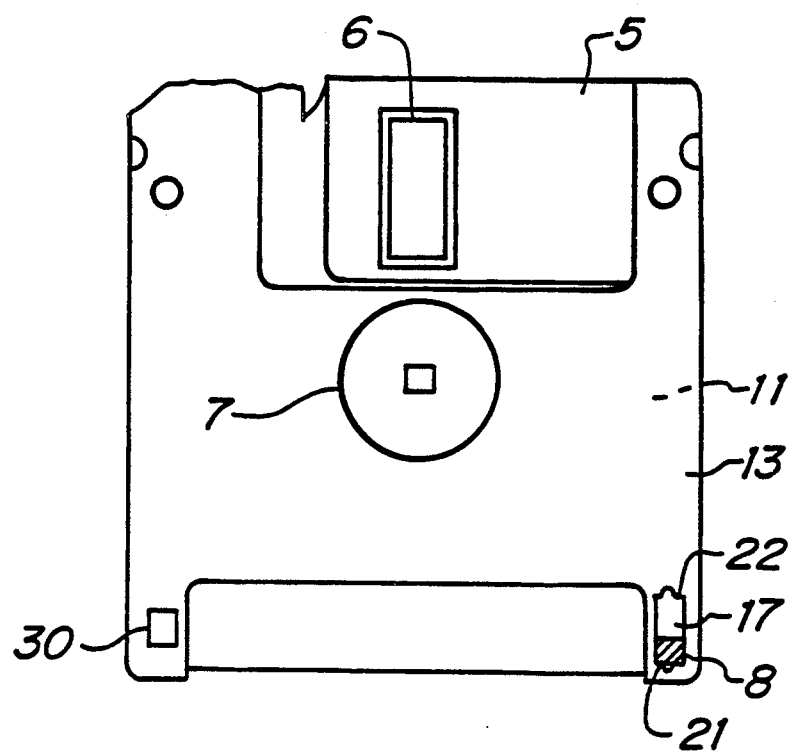
FIG. 1 is a bottom view of a diskette housing or cartridge illustrating a write-protect slider within the aperture of a peripheral recess in a diskette housing.
Figure 2:
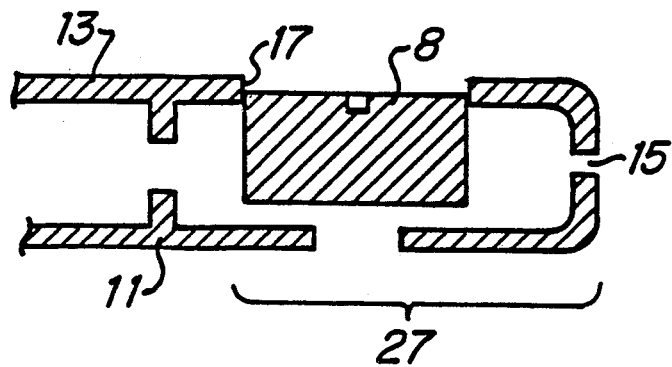
FIG. 2 is a sectional view of the slide component of FIG. 1 within the peripheral recess.

Referring now to FIG. 1 there is shown a bottom view of a diskette housing 9 that includes length and width and thickness dimensions which are in accordance with standards requirements for 3.5" magnetic diskette packages (or cartridges). The diskette cartridge 9 commonly has upper and lower faces 11, 13 of half-side housing components that are joined along seam 15 to enclose a magnetic disk disposed to be rotated by a spindle (not shown for clarity) that is oriented to couple to drive hub 7 for rotation about an axis that is perpendicular to the plane of the drawing. Such conventional magnetic diskette cartridges commonly include a slider or shutter 5 over an access port 6 for a magnetic transducer to interact with a surface or surfaces of the magnetic diskette within the housing 11, 13, and also include a write-protect indicator 8 within a recess 17 in the rear peripheral edge of the diskette cartridge near a corner thereof for positioning therein the tab or slide component 8 that indicates the write-protect condition of the diskette. The recess and a tab or slide component therein is aligned with a transducer or switch in conventional diskette-utilizing equipment to detect the absence or presence of the tab or slide component at a selected location as an indication of the write-protected or write-unprotected condition of the disk within the diskette cartridge. The recess 17 has an aperture 21 of selected length 22 that is greater than the internal width 23 of the write protect cavity. As illustrated in the sectional view of FIG. 2, the recess 17 is relieved internally to a larger length 25 and width 27 below the peripheral edge (and, to a depth through the housing) in order to provide a captivating surface flange around the aperture 17. Recessed slide tracks beneath the surface flange around aperture 17 may provide the captivating guides for a slide component within the recess.

In accordance with the preferred embodiment of the present invention, a slide component 33 has selected length dimension that is greater than the width dimension to fit freely within the aperture 17 in an initial orientation, as shown in FIG. 1. Thereafter, the slide component 33 is rotated within the aperture with the length dimension approaching the maximum internal width dimension 27 of the recess, as illustrated in FIG. 4. The slide component 33 is rotated further into an orthogonal orientation, as shown in FIG. 5, relative to the initial orientation illustrated in FIG. 3. In this orthogonal orientation, the length dimension of the slide component 33 fits within the internal width 27 of the recess, and under the captivating flange around the aperture 17. Of course, slide tracks may also be disposed within the internal walls of the recess to retain the slide component 33 captive therein and to guide the slide component between positions. The width dimension of the slide component 33 is sufficiently smaller than the length of the aperture 17 to facilitate slideable movement within the aperture along the axis of the length dimension of the aperture 17. The slide component is formed of relatively flexible, resilient material such as polyethylene or polypropylene plastic, with rounded edges to accommodate the compression and distortion encountered when rotating the slide component 33 into position, as shown in FIGS. 4 and 5. A slot 37 may be formed in the top of the slide component 33 that protrudes through the aperture 17 to facilitate engagement, for example, by a screwdriver to rotate the component into the orthogonal orientation. Also, the pair of rounded corners on each end of the length of the slide component 33 provides stabilizing 4-point contacts with the internal width 27 of the recess in addition to the convenient rounding of the corners that facilitate rotation of the component 33 through its orientation of maximum angular dimension, as illustrated in FIG. 4.

Figure 7:
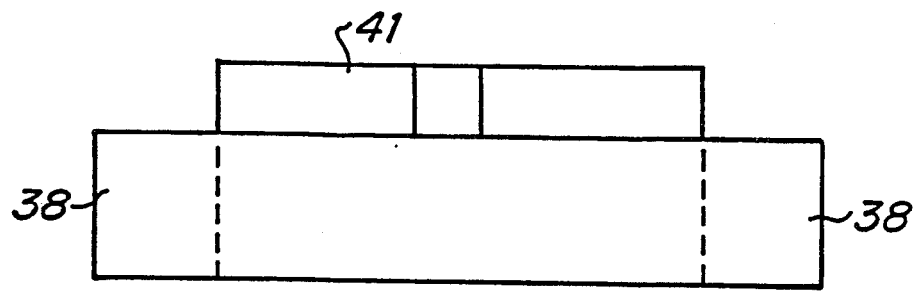
FIG. 7 is an edge view of the slide component of FIG. 3.
Figure 6:
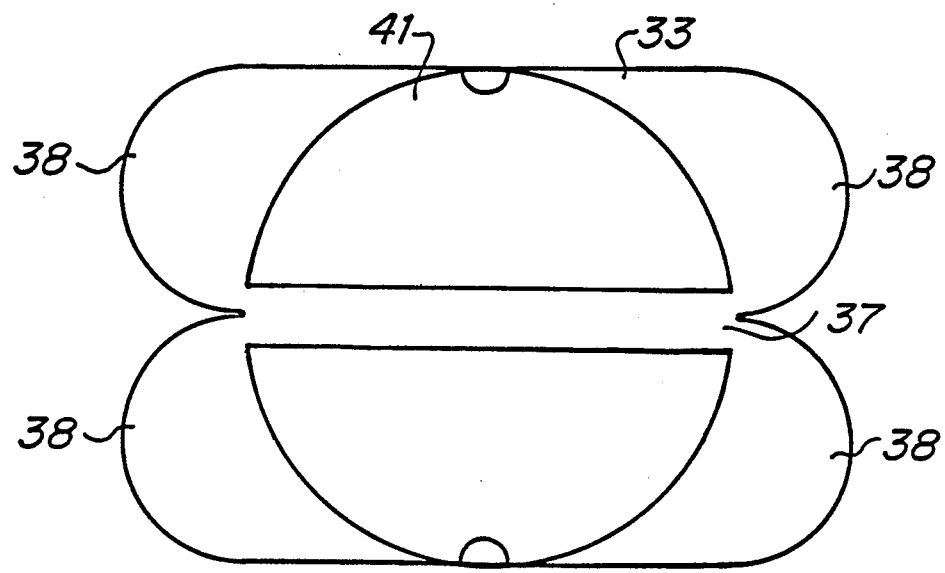
FIG. 6 is a bottom plan view of the slide component of FIG. 3.
Figure 8:
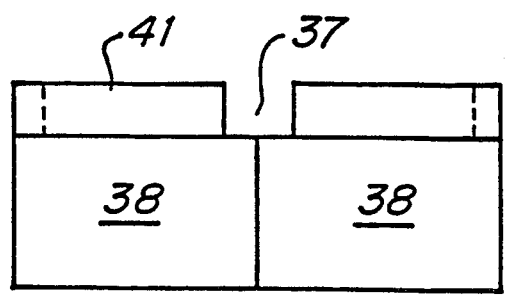
FIG. 8 is an end view of the slide component of FIG. 3.

Referring now to FIGS. 6, 7 and 8, there are shown bottom (or plan) view, edge view, and end view, respectively, of the slide component 33 with rounded corner tabs 38 and screw driver slot 37. The central body 41 of the slide component is round with a diameter approximately equal to the width of the aperture 17 and with a height above the corner tabs 38 that may protrude through the aperture 17 to the surface of the bottom face of the diskette cartridge. This slide component 33 thus formed of flexible, resilient material, as previously described, may thus be inserted into the recess formed in the diskette cartridge, through the surface aperture 17 after the housing is sealed along seam 15, and then rotated into orthogonal position to serve as a captivated slide component within the recess that can be positioned between ends of the aperture to identify the write-protected condition of the magnetic disk within the cartridge.

I claim:

1. A diskette cartridge for a magnetic disk that is disposed for rotation within a housing, the diskette cartridge comprising:
   a recess near a peripheral edge of the housing having selected length and width dimensions and including an aperture for access thereto having an opening width dimension smaller than the recess width dimension; and
   a slide component having a width dimension smaller than the width dimension of the aperture, and having a length dimension larger than the width dimension of the aperture and substantially equal to the width dimension of the recess for admitting insertion of the slide component through the aperture in one orientation and rotation thereof within the recess to an orthogonal orientation with the length of the slide component traversing the width of the recess to support slideable movement of the slide component in said orthogonal orientation within the aperture and recess.

2. The diskette cartridge according to claim 1 wherein said slide component includes a substantially rectangular body having rounded corners to facilitate the rotation thereof within said recess.

3. The diskette cartridge according to claim 1 wherein said slide component is formed of a flexible, resilient material.

4. The diskette cartridge according to claim 1 wherein said slide component includes a body having dimensions smaller than the width of the aperture for protruding therethrough in said one and said orthogonal orientations of the slide component.

5. The diskette cartridge according to claim 4 wherein said body includes a slot depression in an upper surface thereof which protrudes through said aperture to provide rotational driving engagement with the slide component.

* * * * *